United States Patent [19]

Lange et al.

[11] 4,091,436

[45] May 23, 1978

[54] KNOB TYPE SURGE VOLTAGE ARRESTER

[75] Inventors: Gerhard Lange; Gerhard Peche, both of Berlin, Germany

[73] Assignee: Siemens Aktiengesellschaft, Berlin & Munich, Germany

[21] Appl. No.: 735,907

[22] Filed: Oct. 26, 1976

[30] Foreign Application Priority Data

Jan. 23, 1976 Germany ............................ 2602569

[51] Int. Cl.[2] ............................................... H02H 3/22

[52] U.S. Cl. .................................... 361/120; 313/306; 313/308; 313/325

[58] Field of Search ............... 361/117, 120, 126, 127, 361/129, 130; 313/221, 181, 306, 308, 325, 231.1; 315/35, 36

[56] References Cited

U.S. PATENT DOCUMENTS

| | | | |
|---|---|---|---|
| 3,209,197 | 9/1965 | Ahsmann et al. | 313/221 |
| 3,588,576 | 6/1971 | Kawiecki | 361/120 X |
| 3,979,646 | 9/1976 | Peche et al. | 361/120 |

FOREIGN PATENT DOCUMENTS

| | | | |
|---|---|---|---|
| 1,075,726 | 11/1961 | Germany | 361/120 |

*Primary Examiner*—Patrick R. Salce
*Attorney, Agent, or Firm*—Hill, Gross, Simpson, Van Santen, Steadman, Chiara & Simpson

[57] ABSTRACT

A knob type surge voltage arrester has electrodes with conical or semi-circular shape. A coating consisting of electrically conductive material (an ignition aid) is provided on the insulating member. The conductive coating on the insulating body is positioned at a level corresponding to the center of the discharge path defined by active electrode surfaces of the electrodes. The spacing of the active electrode surfaces from one another is smaller than the spacing of the active electrode surfaces relative to the coating.

11 Claims, 2 Drawing Figures

KNOB TYPE SURGE VOLTAGE ARRESTER

BACKGROUND OF THE INVENTION

1. Field of the Invention

The invention relates to a knob type surge voltage arrester with a gas-filled housing, wherein conically or semi-circularly shaped electrodes are positioned opposite one another and are inserted in the ends of a tubular insulating member. Electrode curvatures facing one another form active surfaces for discharge. On an interior of the insulating member at least one coating of electrically conductive material (an ignition aid) extends over a part of the insulating member.

2. Description of the Prior Art

Surge voltage arresters with two symmetrical electrodes having a truncated conical shape and which are inserted in a gas-tight tube-shaped insulating member are generally known. Due to their shape these surge voltage arresters are called knob or button arresters and are distinguished particularly by small dimensions.

It is furthermore known to provide the electrodes of a discharge spark gap for voltage arresters with approximately a conical or a truncated conical shape (compare the German Pat. No. 1,075,726).

Moreover, surge voltage arresters are known in which at least one coating of electrically conductive material on the tube-shaped insulating member of the surge voltage arrester is provided for lowering the ignition voltage. This coating is in the form of a narrow strip which extends in the direction from one electrode to the other electrode (compare U.S. Pat. No. 3,959,696). Such narrow strips which facilitate the ignition of the gas discharge path by means of field distortion at the electrodes are commonly called ignition strips, ignition lines, or ignition aids. These ignition strips are either connected in an electrically conductive fashion to an electrode or they are mounted on the tubular insulating member such that they are insulated from the electrodes. Such known ignition lines which run in axial directions have the disadvantage that they can lead to secondary ignitions. In the case of secondary ignitions of the ignition strip, the strip assumes part of the discharge which renders the ignition strip ineffective and destroys it.

SUMMARY OF THE INVENTION

It is an object of the present invention to create a surge voltage arrester for high actuating voltages wherein the application of ignition aids becomes possible without the occurrence of undesired premature ignitions across the insulating body despite the relatively small diameter of the body. In order to solve this problem in a knob surge voltage arrester of the type initially cited, the invention provides that a coating of electrically conductive material is applied at the level of the center of the discharge path which is defined by the active surfaces of the electrodes, and that the spacing of the active surfaces of the electrodes is smaller than the spacing of the active surfaces of the electrodes relative to the coating of electrically conductive material. The insulating member preferably consists of glass.

It is particularly advantageous to apply the coating of electrically conductive material in the form of one or several dots on the insulating body, or as narrow strips, with the coating extending on the insulating member circularly for a given arc about the center axis of the surge voltage arrester. For the coating material, a mixture of low-melting glass solder and a graphite suspension (hydro-collage) is especially suited. It is of further advantage to dope the coating of electrically conductive material with suitable radioactive materials for the purpose of preionization of the gas (such as nitrogen) within the arrester.

The knob surge voltage arrester of this invention has the advantage of exhibiting only a dot-shaped area in the center as defined by the ball or cone shaped construction of the electrodes. This center area is the smallest spacing to the adjacent electrode so that the arc preferably burns only from this point. A good formation of this point can readily be obtained. Fluctuations of the activating voltage of a single specimen and of other similar units is therefore minimal. Moreover, secondary ignitions are avoided in the electrode and ignition strip arrangement of this invention by virtue of the greater spacings between the electrodes and the ignition strip on the insulating member in relation to the spacings between the electrodes. These secondary ignitions are undesirable since the actuating voltage is reduced in an unpredictable manner.

DESCRIPTION OF THE PREFERRED EMBODIMENTS

Figure 1:
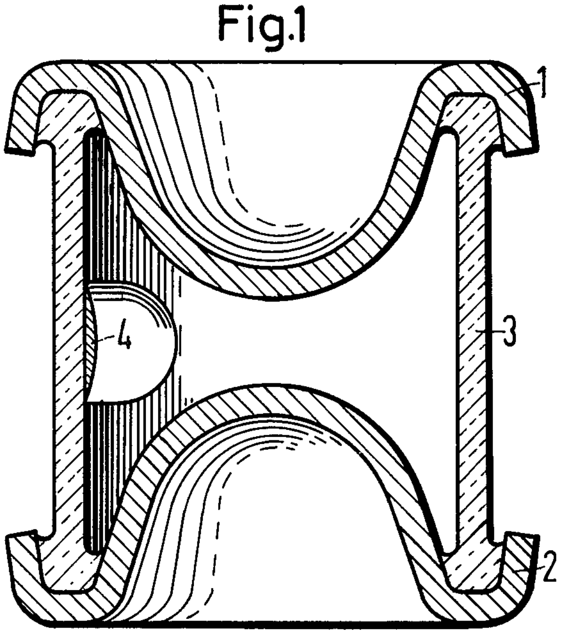
FIG. 1 illustrates a longitudinal section of the knob surge voltage arrester of this invention in which semi-circular electrodes are employed.
Figure 2:
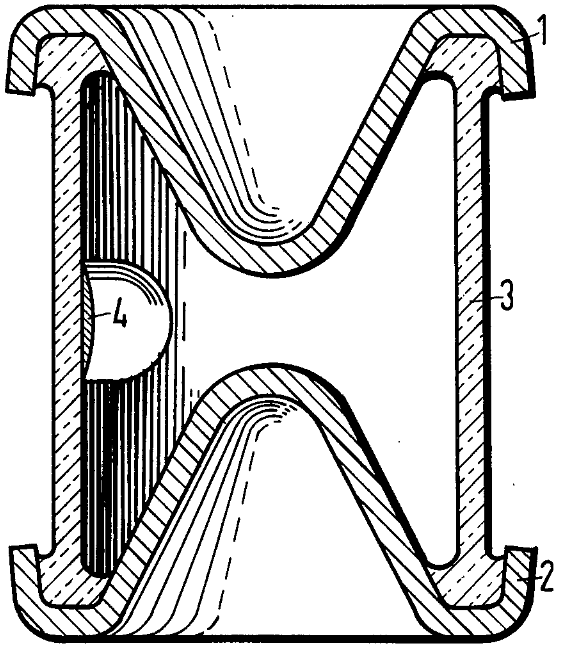
FIG. 2 illustrates a longitudinal section of the knob surge voltage arrester of this invention in which conical-shaped electrodes are employed.

In FIGS. 1 and 2 the same parts are provided with the same reference numerals.

The knob surge voltage arresters represented in FIGS. 1 and 2 show two electrodes 1 and 2 which are inserted in a gas-tight fashion in the ends of an insulating member 3 consisting of glass. In FIG. 1, the electrodes 1 and 2 are provided in a semi-circular shape, and in FIG. 2 in a conical shape. In these sample embodiments, the coating 4 of electrically conductive material extends in the form of a narrow strip on the insulating member 3 circularly for a given arc about the center axis over a portion of the arrester. The maximum distance of the electrodes in the case of knob arresters having semicircular electrode shapes in approximately 1.8 mm. In this electrode arrangement, a desired actuating direct voltage is obtained between 6.6 and 8.6 kV with an internal pressure of 1 to 2 atm nitrogen.

Moreover, it can be of advantage to roughen up at least the interior of the glass insulating member 3 by means of an etching process. The coating 4 then is applied by rubbing off a graphite lead.

Advantageously, the insulating member 3 can also consist of ceramic material. The ceramic tube can be metallized at the ends and then hard soldered to the electrodes 1 and 2.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. In a knob type surge voltage arrester formed as a gas-filled housing with curve-shaped electrodes opposite one another inserted in ends of a tube-shaped insulating member of the housing, convex curvature portions of the electrodes which face each other forming active arcing surfaces of the electrodes, a coating of electrically conductive ignition material being coated over a part of the interior of the insulating member, the improvement which comprises coating the electrically conductive material on the interior of the insulating member at a level corresponding to the center of a discharge path defined by the active surfaces of the electrodes, the conductive material extending substantially parallel to a center axis substantially only between said active arcing surfaces and being shaped such that the spacing of the active surfaces of the electrodes from one another is smaller than the spacing of the active surfaces of either of the electrodes from the coating of electrically conductive material, and the conductive material extending on the insulating member as a narrow strip in a circular path for a given arc about the center axis of the surge voltage arrester.

2. The knob type surge voltage arrester according to claim 1, characterized in that the insulating member consists of glass.

3. The knob type surge voltage arrester according to claim 1, characterized in that the coating of electrically conductive material consists of a mixture of low-melting glass solder and a graphite suspension.

4. The knob type surge voltage arrester according to claim 1, characterized in that the coating of electrically conductive material is radioactively doped.

5. The knob type surge voltage arrester of claim 1 in which the curve-shaped electrodes are semi-circular.

6. The knob type surge voltage arrester of claim 1 in which the curve-shaped electrodes are conical.

7. The knob type surge voltage arrester of claim 1 which the insulating member consists of ceramic.

8. A knob type surge voltage arrester comprising:

(a) a tube-shaped insulating member;

(b) opposite facing curve-shaped inwardly extending electrodes sealed at opposite ends of the insulating member, an active convex discharge surface of each electrode being created at a convex curved portion of the opposite facing electrodes which are in closest approach to each other;

(c) a gas sealed within said insulating member;

(d) a coating of electrically conductive material on the interior of the insulating member at a level corresponding to the center of a discharge path defined between the active discharge surfaces of the electrodes, said coating extending substantially only between the closest approach active discharge surfaces of the electrodes, the conductive material being shaped such that the spacing of the active surfaces from one another is smaller than the spacing of the active surfaces of the electrodes from the coating of electrically conductive material.

9. The knob type surge voltage arrester of claim 8 in which the distance between the electrodes is smaller than the distance from one electrode to the coating plus the distance from the other electrode to the coating.

10. The knob type surge voltage arrester of claim 8 in which the distance between electrodes is smaller than the distance from either electrode to the coating.

11. In a knob type surge voltage arrester formed as a gas-filled housing with curve-shaped electrodes opposite one another inserted in ends of a tube-shaped insulating member of the housing, convex curvature portions of the electrodes which face each other forming active arcing surfaces of the electrodes, a coating of electrically conductive ignition material being coated over a part of the interior of the insulating member, the improvement which comprises coating the electrically conductive material on the interior of the insulating member at a level corresponding to the center of a discharge path defined by the active surfaces of the electrodes, the conductive material extending substantially parallel to a center axis substantially only between said active arcing surfaces and being shaped such that the spacing of the active surfaces of the electrodes from one another is smaller than the spacing of the active surfaces of either of the electrodes from the coating of electrically conductive material, and the coating of electrically conductive material being applied to the insulating member in the form of at least one dot.

* * * * *